Aug. 26, 1958 W. G. SMITH ET AL 2,849,345
PRELIMINARY PRESSING OF BENT GLASS ASSEMBLIES
Filed Aug. 27, 1952 6 Sheets-Sheet 4

INVENTORS
BROOK J. DENNISON &
WILLIAM G. SMITH
BY

ATTORNEYS

INVENTORS.
BROOK J. DENNISON &
WILLIAM G. SMITH

FIG. 8.

United States Patent Office 2,849,345
Patented Aug. 26, 1958

2,849,345

PRELIMINARY PRESSING OF BENT GLASS ASSEMBLIES

William G. Smith and Brook J. Dennison, Tarentum, Pa., assignors to Pittsburgh Plate Glass Company Application August 27, 1952, Serial No. 306,532

7 Claims. (Cl. 154—2.7)

This invention relates to apparatus and method for making laminated assemblies of glass and interposed plastic sheets, commonly known as safety glass, and more particularly to the preliminary pressing of curved or bent laminated assemblies to provide a sufficient seal between the plastic interlayer and the glass sheets so as to dispense with the use of the rubber bag commonly used to enclose the assembled sheets during the autoclaving step.

In the manufacture of such laminated assemblies it is desirable to obtain the final, overall, adhesive bond between the glass sheets and the interposed thermoplastic sheet by subjecting the assembled sheets to heat and pressure while immersed in oil in an autoclave. Unless the edges of the sheets are sealed or otherwise protected, however, the oil in the autoclave may penetrate between the laminations and discolor the assembled sheets. In the manufacture of flat laminated assemblies it has been customary to subject the assembled sheets to a preliminary pressing by passing them between one or more pairs of rolls covered with suitable resilient material, commonly called nipper rolls. This operation forced the air out from between the assemblied sheets and provided a sufficient seal extending over the entire area of the sheets to prevent damage from the oil when directly immersed therein in the autoclave.

In the manufacture of bent or curved laminated assemblies, such as for example as curved windshield panels, curved lenses for goggles, and the like, the use of the conventional nipper rolls has not been satisfactory. Because the sheets are bent or curved, it has been necessary to provide attachments for tipping and oscillating the laminated assembly as it is fed into and passes through between the rolls. These attachments are complicated in structure and operation and it is difficult to make them accommodate for minor manufacturing variations in the curvature of the glass. Moreover, the conventional nipper rolls do not adjust to compensate for transverse or cross sag which may have affected the glass during the bending operation. For these reasons it is practically impossible to apply a controlled uniform pressure over the entire area of the assembled sheets with the nipper rolls, and consequently there is excessive breakage of glass during the preliminary pressing operation, and danger of penetration of oil at the edges during the autoclaving step. As an alternative, it has been the customary practice to place the assembled laminated sheets in a flexible container, for example a rubber bag, which is then evacuated to hold the assembled sheets in proper position during the autoclaving operation. In this case, even though there is no preliminary sealing of the edges of the laminations, penetration of oil between the laminations is prevented by the bag. This method, while producing a satisfactory product, has been expensive, cumbersome and time-consuming in operation.

The present invention has for an object the provision of apparatus and method for the preliminary pressing of bent or curved assemblies to provide a sufficient seal between the plastic interlayer and the glass sheets at the edge of the assembly so as to dispense with the use of a rubber bag during the autoclaving operation. In most cases the apparatus will be used only to preliminarily secure the sheets together, the final pressing being accomplished in an autoclave in which the laminated assemblies are exposed directly to heated oil or other liquid under high pressure, but in other cases the apparatus may be employed to completely and finally laminate the assemblies. A further object of the invention is to provide improved nipper rolls for pressing laminated assemblies of glass and interposed plastic sheets. Still another object of the invention is to provide an improved mounting for the nipper rolls whereby the plane in which the axes of the rolls lie is free to shift relative to the assembly as the assembly passes therethrough to accommodate for the curvature thereof. Other objects and advantages of the invention will appear hereinafter.

A preferred embodiment of the invention has been selected for purposes of illustration and is shown in the accompanying drawings, wherein.

According to the present invention the nipper rolls for pressing the assembled glass and interposed plastic sheets together are mounted one above the other in a balanced housing which is free to turn, within a limited range, about a horizontal axis substantially coinciding with the line of contact between the rolls. Suitable conveyor means move the laminated glass and plastic assemblies along a horizontal path toward the rolls, with the axis of curvature of the bend substantially parallel to the axes of the rolls and with the upwardly bent end forward. The balanced housing is adjustable vertically relative to the conveyor to bring the bite of the rolls to the height of the bent forward edge of the approaching assembly, and means are provided for intermittently turning the balanced housing about its pivotal axis to receiving position, i. e. with the plane in which the axes of the rolls lie substantially normal to the bent forward edge of the assembly.

When the forward edge of the assembly reaches the rolls, which are suitably driven, it enters between the rolls and the rolls grip and feed the assembly therethrough. As the assembly is fed through between the rolls the balanced housing turns freely about its horizontal axis under the shifting weight and leverages of the assembly from receiving position to discharge position, where the assembly is deposited on another conveyor which moves it away from the rolls.

By reason of the fact that the balanced housing is free to turn about its horizontal axis, it adjusts to the curvature of the glass so that the pressure applied by the nipper rolls on successive increments of the assembled glass and plastic sheets always is normal thereto. Attachments for oscillating or tipping the glass are unnecessary. Desirably check means are associated with the balanced housing to limit the turning rate and so reduce danger of breakage as the forward end of the assembly moves down on to the discharge conveyor.

To accommodate for transverse or cross sag which may have affected the glass during the bending operation, and to insure the application of substantially uniform resilient pressure across the entire width of the assembly as it moves between the rolls, inflated nipper rolls are used. The construction of the rolls is such that the roll surface can adjust to transverse or cross sag in the glass without exerting pressure of sufficient magnitude to be likely to break the glass. Air connections through hollow stub shafts at the ends of the rolls permit inflation of the nipper rolls to the desired pressure.

The apparatus of the present invention is adapted to be incorporated in a continuous flow system in which the laminated assemblies move without interruption along a horizontal path from their place of assembly through a series of successive heating ovens and balanced roll housing to the autoclave.

As illustrated in Figures 1 to 4 of the drawings, the supporting structure or stand for the balanced housing comprises four vertical frame members 11 which are secured at their lower ends to a suitable base and are connected near their tops and their bottoms by horizontal side pieces 12 and end pieces 13. Conveniently this structure may be welded.

Each of the vertical frame members is provided on its inner side with a bearing block 14 and bearings 15 which support a vertical shaft 16. The lower portions of these shafts 16 are threaded. At opposite sides of the supporting structure are the two horizontal beams 17 which provide the pivotal mounting for the balanced housing. Each end of a beam 17 has threaded engagement with the lower threaded portion of one of the shafts 16. In the illustrative embodiment the beam end has a bore which is larger than the shaft, and nuts 18, welded to the beam, provide the threaded connection.

Means are provided for simultaneously rotating all of the shafts 16 in the same direction and at the same speed. As shown, each shaft has secured thereon near its upper end a sprocket 19. A roller chain 20 engages all four sprockets, as well as idler sprockets 21 and 22 mounted on a plate secured on one of the upper side pieces 12 of the stand. The idler sprocket 22 is adjustably mounted to permit control of the tension in the roller chain. Secured on the upper end of one of the shafts 16 is a hand wheel 23. Rotation of the hand wheel 23 directly turns the associated shaft 16 and, through the roller chain 20 and sprockets 19, produces a similar turning of the three other shafts 16. This results in raising or lowering the horizontal beams 17 uniformly, thus providing for vertical adjustment of the balanced housing pivotally mounted in the beams.

In assembling the machine the horizontal beams 17 are adjusted to the same elevation in the supporting structure. Centrally of each beam 17 is a horizontal bearing. These bearings support the pivot portions of the T-shaped pivot bars 24, the pivot portions projecting from opposite ends of the balanced housing in which the nipper or pressing rolls are mounted. Thus there is provided a pivotal mounting for the housing on a horizontal axis.

Check means are provided for limiting the rate of turning of the housing about its horizontal axis. As shown, the pivot of one of the pivot bars 24 projects out beyond its bearing in the beam 17 and has secured thereon a cross bar 25, opposite ends of which are connected to the levers of door checks 26 mounted on brackets secured to the horizontal beam 17. The rate of turning of the housing may be controlled by adjustment of the door checks.

Above and below the cross portion of each pivot bar 24, and adjustably secured thereto, is a T-shaped frame 27 in which the nipper rolls and suitable driving and backing means therefor are mounted. The cross portions of the T-shaped frames 27 are secured to opposite sides of the cross portions of the pivot bars 24 by screws 28 so that adjustment of these screws simultaneously moves both frames toward or away from the cross portion of the associated pivot bar. Secured in the frames 27, as by a pressed fit, are the bearings for the nipper roll 29. Adjustably mounted with respect to the frames 27 are the bearing plates for the driving roll 30, disposed above the nipper roll in the upper frame and below the nipper roll in the lower frame, and two idler rolls 31 disposed on opposite sides of the nipper roll. The construction of the inflated nipper rolls will be described hereinafter. Passing between the idler rolls 31 and the nipper roll 29, around the arc of the nipper roll opposite the line of contact between the two nipper rolls, is an endless belt 32 of width substantially equal to the length of the nipper roll. This belt also passes around the driving roll 30, and serves to support and drive the nipper roll.

The bearing plates 34 for the driving roll 30 may be adjusted relative to the frames 27, toward or away from the nipper roll, by means of screws 33 to control the tension of the belt, and will be held in adjusted position by bolts 34' passing through slots in the vertical portion of the T-shaped frame and holes in the bearing plate 34. The bearing plates 35 for the idler rolls 31 are adjustable along an adjustment plate 36 toward and away from the nipper roll and are secured to the plate 36 in adjusted position by bolts 37. The adjustment plate 36 desirably is adjustable along the vertical portion of the frame 27 by means of screws 39, and is secured in adjusted position thereon by bolts 38.

Mounted on one end of the balanced housing, secured to one of the frames 27, is an electric motor 40 which may be connected through suitable speed reducing or variable drive mechanism 41 to the upper driving roll 30. Secured on the ends of the driving roll shafts at the opposite end of the balanced housing are sprockets which are connected by a roller chain 42 to turn the lower driving roll in the opposite direction. Operation of the motor to drive the upper driving roll in counterclockwise direction, as viewed in Figure 3, will result in driving the belts 32 to cause rotation of the nipper rolls to feed a laminated glass and plastic assembly through between the rolls from right to left, as viewed in this figure. The belts not only drive the nipper rolls, but provide a backing support therefor.

Figure 5:
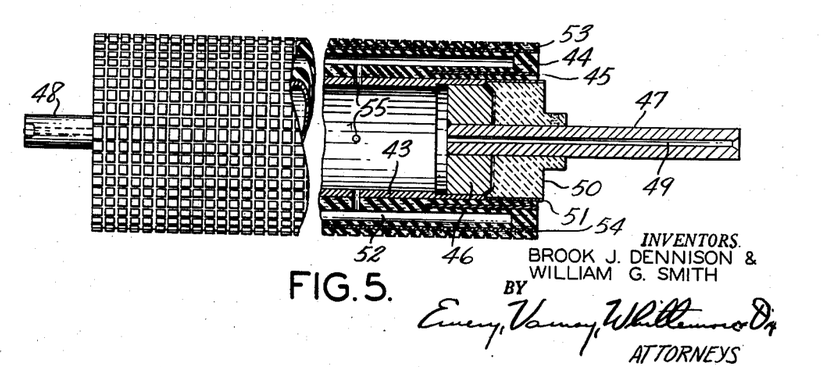
Figure 5 is a view partly in side elevation and partly in longitudinal section of one of the inflated rolls.

A preferred construction of the inflated nipper roll is shown in Figure 5. The nipper roll comprises a foraminous core portion, for example a steel tube 43 on which is molded a rubber covering 44, preferably having about two turns of single ply tire friction 45 embedded in the end portions thereof projecting beyond the ends of the steel tube. Desirably the cords of the tire friction 45 extend parallel to the axis of the roll. Secured in the ends of the steel tube 43, preferably by welding, are end pieces 46, in which are centered the stub shafts 47, 48 for supporting the nipper roll in its bearings in the frames 27. At least one of these stub shafts has an axial opening 49 for continuously supplying air under pressure to inflate the roll during operation of the preliminary press.

Since the molded rubber covering 44 desirably projects beyond the ends of the steel tube 43, temporarily end pieces 50 are provided to support the projecting portions of the covering 44 during the molding operation. These temporary end pieces form no part of the finished roll and will be wrapped with paper 51 to permit their withdrawal upon completion of the roll.

After the covering 44 has been molded on the tube 43, the covering will be ground out, except for narrow ring portions at the ends, to provide a coaxial air space 52. A plurality of holes 55 are drilled through the cover 44 and tube 43 to provide for passage of air from the interior of the tube 43 to the air space 52. Then a preformed rubber sleeve 53, preferably having embedded therein about two wrappings of single ply tire friction 54 is slipped on over the covering 44 and molded at its ends to the narrow ring portions at the ends of the covering 44. Desirably the cords in the tire friction layer 54 extend circumferentially of the sleeve. The outer surface of the sleeve 53 may be grooved somewhat as shown, if desired, for the purpose of better gripping the laminated glass and plastic assembly as it passes between a pair of nipper rolls.

It will be evident from inspection of Figure 5 that the inflated nipper roll of the present invention has a flexible resilient surface which is free to give throughout its entire length, and to conform closely to the surface of a glass sheet with little danger of glass breakage. Transverse or cross sag in the glass will be accommodated for through the cushioning effect of the coaxial air space 52.

Figure 2:
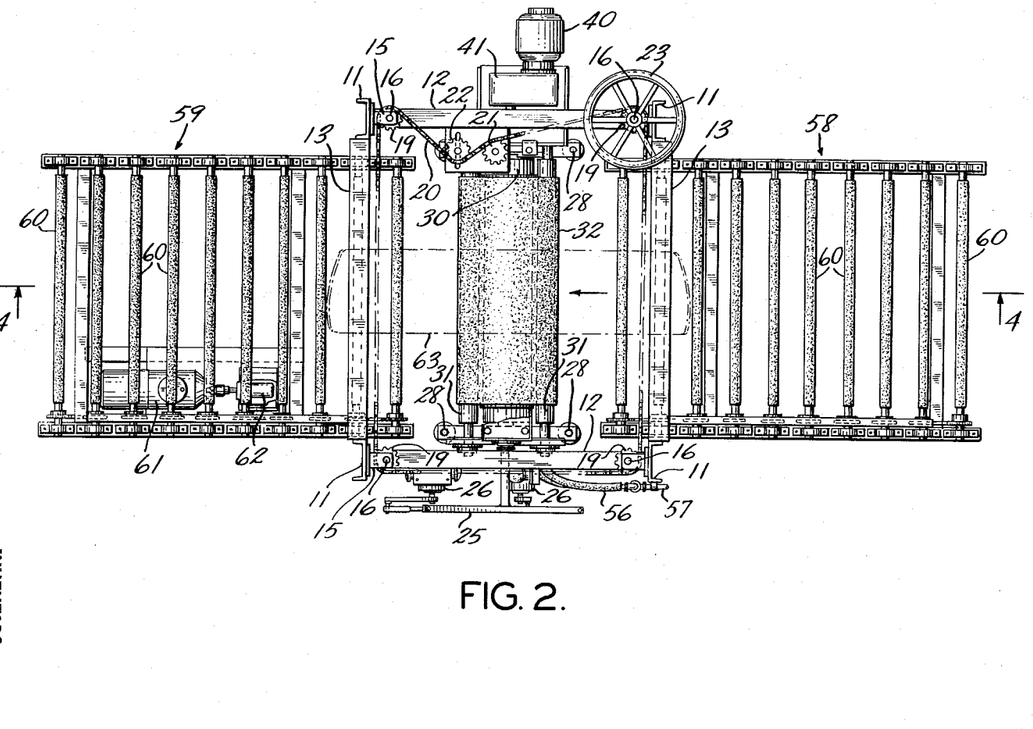
Figure 2 is a top plan view of the apparatus shown in Figure 1, but showing the laminated assembly midway in its passage through between the rolls.
Figure 3:
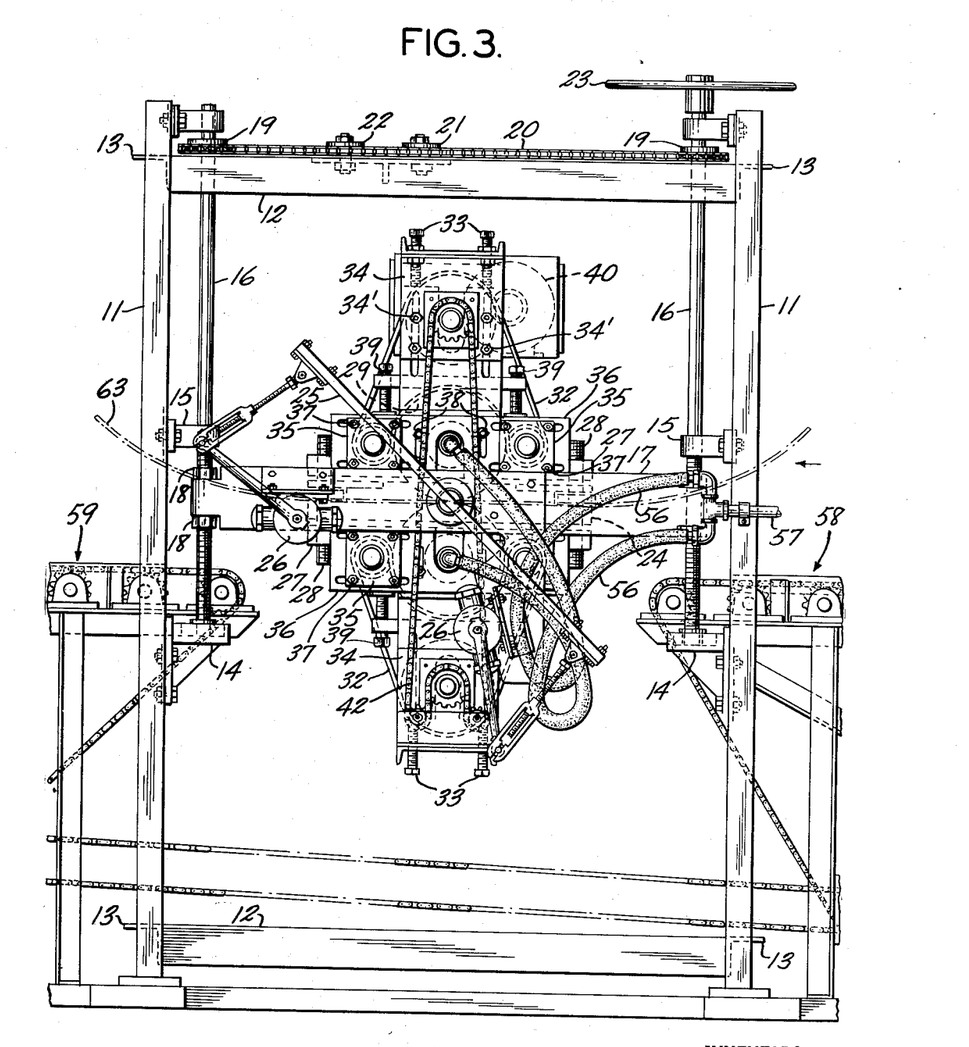
Figure 3 is a side elevation of the pressing apparatus to enlarged scale as compared to Figure 1, showing details of the roll housing and its mounting.
Figure 8:
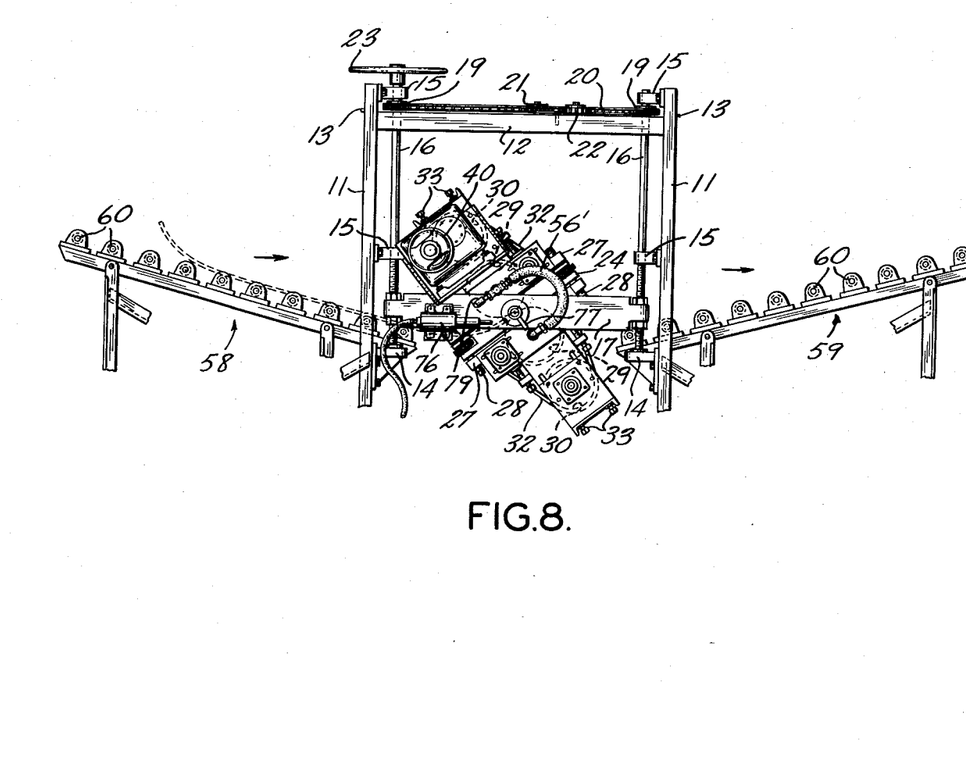
Figure 8 is a side elevation of the pressing apparatus from the opposite side as viewed in Figures 1, 3 and 4, and showing the conveyors tilted from the horizontal.

As may be seen in Figures 2 and 3, when the nipper rolls are assembled in the pressing machine the ends of the nipper roll shafts 47 will be connected by suitable connectors and hoses 56 to a pipe line 57 for supplying air under pressure to inflate the rolls. The air passes from the pipe line 57 through the hoses 56 and the axial openings 49 in the shafts 47 into the tube 43, and thence through the holes 55 into the air space 52. Desirably the shafts 48 at the opposite ends of the rolls also are provided with axial bores and are connected together by a hose 56', as shown in Figure 8. The hose 56' equalizes pressure within the rolls when a difference of pressure is caused by sag in the laminated assembly that is passed between the rolls during the pressing operation. An automatic pressure release valve may be provided either in the hose 56', as illustrated at 79, or in the pipe line 57 for the purpose of limiting the pressure within the rolls to a desired value.

Suitable conveyors for moving the laminated glass and plastic assemblies to the press are shown in Figures 1 to 4, the conveyor for delivering the assemblies to the press being designated generally by the reference number 58, and the conveyor for moving the assembly away from the press being designated 59. As shown, these conveyors comprise frames in which a series of horizontal, rubber covered rolls 60 support the laminated assemblies. The conveyor rolls, having sprockets secured on their ends, are driven through roller chain connections by a motor 61 and suitable speed control means 62, all as will be apparent from the drawings.

Figure 1:
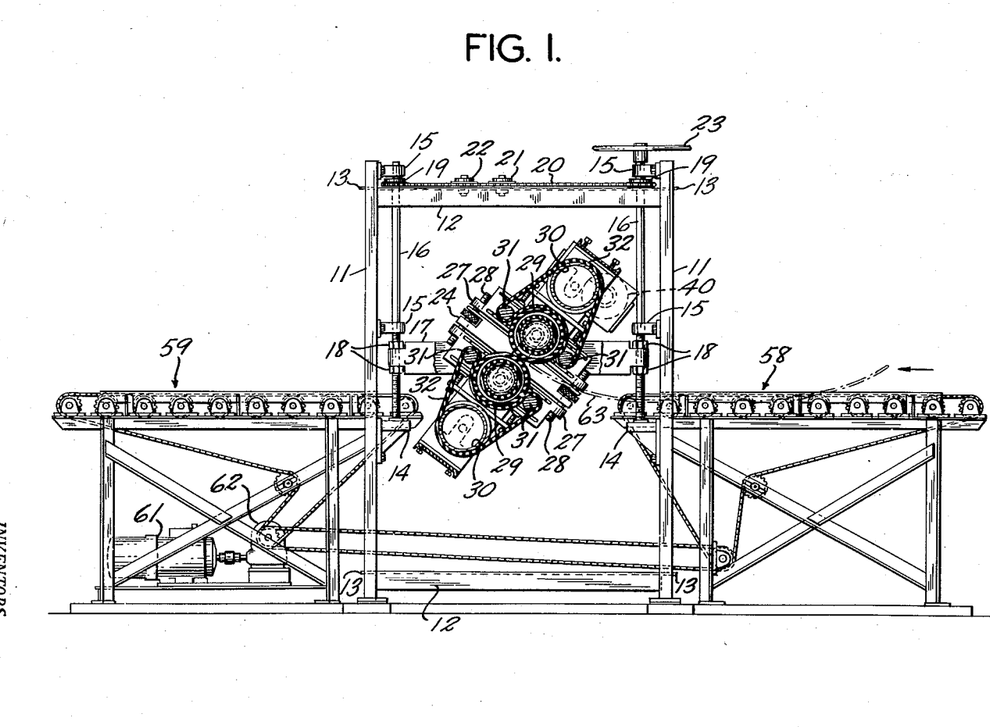
Figure 1 is a side elevation of the pressing apparatus including the conveyors which convey laminated glass and plastic assemblies to the rolls and away from the rolls, parts of the balanced housing in which the rolls are mounted being broken away to show the rolls in vertical section, and showing an assembly about to enter between the rolls.
Figure 4:
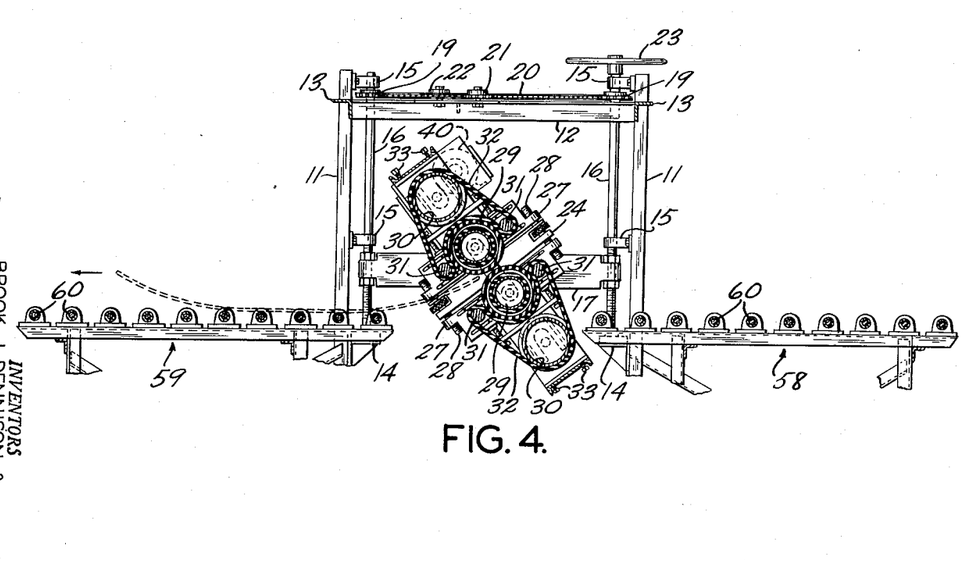
Figure 4 is a vertical section through the rolls similar to Figure 1, but showing the position of the rolls immediately following discharge of an assembly from therebetween, the showing of the conveyors being fragmentary and in vertical section.

Figure 1 shows a laminated glass and plastic assembly 63 on the conveyor 58, just about to reach the nipper rolls. This assembly might be a curved windshield or rear light for an automobile. The assembly moves along the conveyor with its axis of curvature substantially parallel to the axes of the nipper rolls 29, and with an upwardly bent edge forward. The balanced housing has been turned to the right, or receiving position, for example by means of an intermittently operated air piston. Such an air piston is illustrated at 76 in Figure 8, mounted on horizontal beam 17. The air piston momentarily presses against crank 77 secured on the end of pivot bar 24 and turns the housing from discharge position to receiving position following discharge of a laminated assembly from the nipper rolls on to the conveyor 59. In receiving position, the plane in which the axes of the nipper rolls lie desirably is substantially normal to the bent forward end of the assembly 63. The balanced housing previously has been adjusted vertically, so that the forward edge of the assembly 63 will enter between and be gripped by the nipper rolls and fed therethrough. As the bent forward end of the assembly 63 passes between the nipper rolls, the balanced housing turns about its horizontal axis, first under the influence of the leverages exerted by the assembly, now supported jointly by the nipper rolls and the conveyor, and then under the influence of the shifting weight of the assembly as it moves through between the rolls. Figure 2 shows the position of the balanced housing with the assembly 63 about half way through, or a little more. As the assembly continues to move through between the nipper rolls, the balanced housing turns further to the left, its rate of turning being limited by the check means, and the forward edge of the assembly moves down under the influence of gravity and is deposited on the conveyor 59. Figure 4 shows the assembly 63 just after it has been discharged on to this conveyor. The balanced housing then is returned to receiving position by the air piston 76 and is ready to receive the next laminated assembly from the conveyor 58. During passage of the assembly between the nipper rolls, equalized pressure is applied to opposite sides of successive increments of the assembly, always in a direction normal to the surfaces of the assembly.

Figure 7:
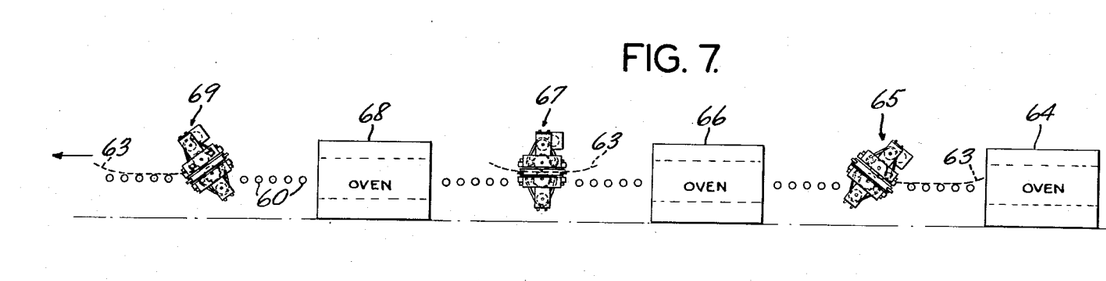
Figure 7 is a flow diagram showing the passage of assembled glass and plastic sheets through a succession of heating ovens and sets of nipper rolls to seal the sheets together.

In the preliminary pressing of laminated glass and plastic assemblies according to the present invention it may be desirable to pass the assembly in a continuous line through a series of successive ovens to repeatedly heat and press the sheets together. Such an arrangement is illustrated in Figure 7, where the laminated assemblies, moving in a straight line from right to left, pass through a first oven 64, through a balanced nipper roll housing 65, through a second oven 66, through a second balanced nipper roll housing 67, through a third oven 68, and then through a third balanced nipper roll housing 69, from where they may be taken directly to the autoclave.

Figure 6:
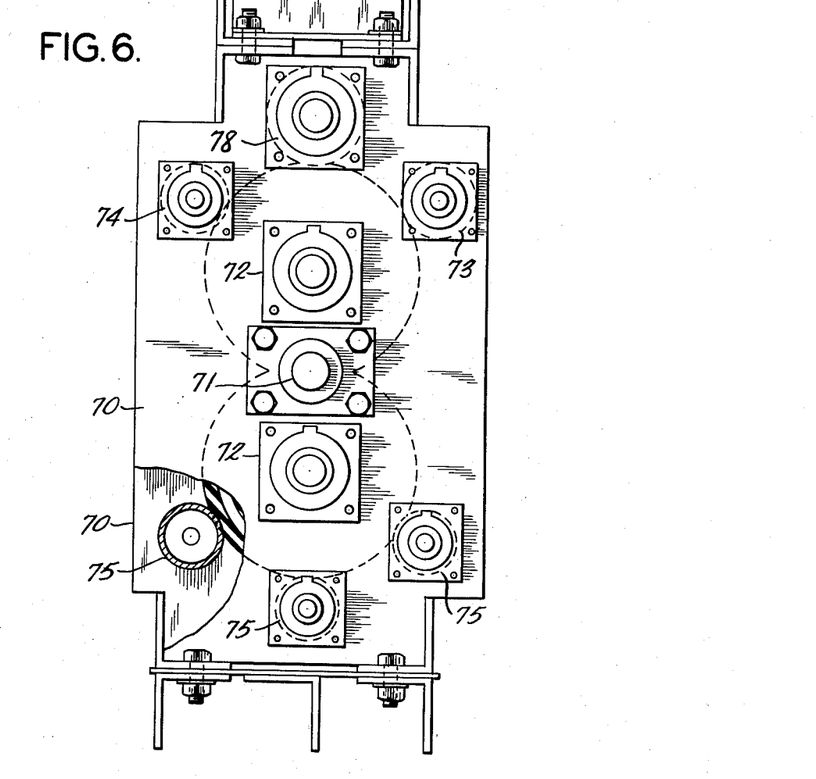
Figure 6 is an end elevation of a modified roll mounting structure.

Figure 6 is an end elevation of an alternate form of balanced housing. The end frames 70 are provided with pivots 71, to be received in the bearings of the horizontal beams 17 of the apparatus shown in Figures 1 to 4. Secured to the end frames equidistant above and below the pivots, are bearing plates 72 for the inflated nipper rolls, the rolls being indicated in broken lines. The driving and backing belt for the upper nipper roll, as employed in the embodiment of Figures 1 to 4, is replaced by a drive roll 78 in direct driving engagement with the nipper roll, the drive roll being mounted in bearing plates secured to the end frames 70. Idler backing rolls 73 and 74 are mounted in bearing plates secured to the end frames and have rolling contact with the upper nipper roll. The lower nipper roll is backed by three idler rolls 75, which may be similar to the idler roll 74. The drive roll 78 and the idler rolls 74 and 75 may be steel rolls. The idler roll 73 preferably had a molded rubber covering. This simplified mounting arrangement for the nipper, drive, and backing rolls in the balanced housing may be used with the inflated nipper rolls illustrated in Figure 5.

A modified arrangement of the conveyor is illustrated in Figure 8. The conveyor 58 which delivers laminated assemblies to the press is tilted downwardly toward the press, and the conveyor 59 which moves the assemblies away from the press is tilted upwardly away from the press. An advantage of this arrangement resides in the fact that laminated assemblies having a bend greater than 90° can be handled by the apparatus without requiring too much turning of the pivotally mounted balanced housing about its axis. Moreover, the tilted conveyors provide additional support for the laminated assembly passing through between the nipper rolls and minimize the possibility of fracture due to the moment caused by the weight of the assembly itself. While the angles at which the conveyors are tilted may vary, in a preferred embodiment the conveyor 58 is tilted at an angle of about 15° to 20° from the horizontal, and the conveyor 59 is tilted at an angle of about 15° from the horizontal.

It will be understood that the invention herein disclosed may be variously modified and embodied within the scope of the subjoined claims.

We claim:

1. Apparatus for the preliminary pressing of bent laminated assemblies comprising two sheets of glass and an interposed sheet of thermoplastic material which are to be bonded together into a unitary structure by the action of heat and pressure, which apparatus comprises, in combination, a supporting structure, a balanced housing pivotally mounted on a horizontal axis in said supporting structure, a pair of cooperating nipper rolls mounted horizontally one above the other in the balanced housing, means for conveying a bent laminated glass and plastic assembly along a path toward the rolls with the axis of curvature of the bend substantially parallel to the axes of the rolls, means for turning the balanced housing about its pivotal axis to receiving position at which the bent forward edge of the laminated assembly will enter between and be gripped by the rolls as the assembly is conveyed toward the rolls, means for driving the rolls to feed the laminated assembly through between the rolls, the mounting means for the balanced housing permitting free turning movement of the housing about its pivotal axis within a limited range as the laminated assembly is fed through between the rolls, means for receiving the laminated assembly as it is discharged from between the rolls and for conveying the assembly away from the rolls, and check means operatively connected between the balanced housing and the supporting structure for limiting the rate of turning of the balanced housing about its pivotal axis from receiving position to discharge position as the laminated assembly is fed through between the rolls.

2. Apparatus for the preliminary pressing of bent laminated assemblies comprising two sheets of glass and an interposed sheet of thermoplastic material which are to be bonded together into a unitary structure by the action of heat and pressure, which apparatus comprises, in combination, a supporting structure, a balanced housing pivotally mounted on a horizontal axis in said supporting structure, a pair of cooperating nipper rolls mounted horizontally one above the other in the balanced housing, means for conveying a bent laminated glass and plastic assembly along a path toward the rolls with the axis of curvature of the bend substantially parallel to the axes of the rolls, means for turning the balanced housing about its pivotal axis to receiving position at which the bent forward edge of the laminated assembly will enter between and be gripped by the rolls as the assembly is conveyed toward the rolls, means for driving the rolls to feed the laminated assembly through between the rolls, the mounting means for the balanced housing permitting free turning movement of the housing about its pivotal axis within a limited range as the laminated assembly is fed through between the rolls, means for receiving the laminated assembly as it is discharged from between the rolls and for conveying the assembly away from the rolls, and check means operatively connected between the balanced housing and the supporting structure for limiting the rate of turning of the balanced housing about its pivotal axis from receiving position to discharge position as the laminated assembly is fed through between the rolls, said supporting structure including vertically adjustable supporting members pivotally mounting the balanced housing to the supporting structure and for adjusting the balanced housing vertically in the supporting structure relative to the means for conveying the bent laminated glass and plastic assemblies toward the rolls to bring the bite of the rolls to the height of the bent forward edge of the assembly when the housing is turned to receiving position.

3. Apparatus for the preliminary pressing of bent laminated assemblies comprising two sheets of glass and an interposed sheet of thermoplastic material which are to be bonded together into a unitary structure by the action of heat and pressure, which apparatus comprises, in combination, a supporting structure, a balanced housing pivotally mounted on a horizontal axis in said supporting structure and having a limited range of oscillatory movement about its axis, a pair of cooperating nipper rolls mounted horizontally one above the other in the balanced housing, means for driving the rolls, and means directly connected to the supporting structure for intermittently turning the balanced housing to one limit of its range to receive the forward edge of a bent laminated assembly.

4. Apparatus according to claim 3, in which the surface of each roll comprises a flexible, resilient, cylindrical shell substantially impervious to air, and in which means are included for maintaining the cylindrical shell in inflated condition, and other means including backing rolls for causing the inflated nipper rolls to grip and press a laminated assembly passing therebetween.

5. Apparatus according to claim 4, including continuous, tensioned backing belts which pass between the inflated rolls and the backing rolls and engage and support arcs of the inflated rolls opposite the bite of the rolls.

6. Apparatus for the preliminary pressing of bent laminated assemblies comprising two sheets of glass and an interposed sheet of thermoplastic material which are to be bonded together into a unitary structure by the action of heat and pressure, which apparatus comprises, in combination, a supporting structure, a balanced housing pivotally mounted on a horizontal axis in said supporting structure and having a limited range of oscillatory movement about its axis, a pair of cooperating inflated nipper rolls mounted horizontally one above the other in the balanced housing, means for driving the rolls, and means for continuously supplying air under pressure to the inflated rolls.

7. Apparatus for the preliminary pressing of bent laminated assemblies comprising two sheets of glass and an interposed sheet of thermoplastic material which are to be bonded together into a unitary structure by the action of heat and pressure, which apparatus comprises, in combination, a supporting structure, a balanced housing pivotally mounted on a horizontal axis in said supporting structure and having a limited range of oscillatory movement about its axis, a pair of cooperating inflated nipper rolls mounted horizontally one above the other in the balanced housing, means for driving the rolls, and a pressure equalizing connection between the inflated rolls.

References Cited in the file of this patent

UNITED STATES PATENTS

| | | |
|---|---|---|
| 689,590 | Johnson | Dec. 24, 1901 |
| 710,327 | Kling | Sept. 30, 1902 |
| 2,025,115 | Lytle | Dec. 24, 1935 |
| 2,075,726 | Kamerer | Mar. 30, 1937 |
| 2,334,651 | Schafer | Nov. 16, 1943 |
| 2,525,980 | Walters | Oct. 17, 1950 |
| 2,635,973 | Swindler | Apr. 21, 1953 |
| 2,673,168 | Pascoe et al. | Mar. 23, 1954 |

Dedication 2,849,345.—*William G. Smith* and *Brook J. Dennison*, Tarentum, Pa. PRELIMINARY PRESSING OF BENT GLASS ASSEMBLIES. Patent dated Aug. 26, 1958. Dedication filed July 25, 1973, by the assignee, *PPG Industries, Inc.*

Hereby dedicates the remainder of its term to the free use and benefit of the People of the United States.

[*Official Gazette December 4, 1973.*]